No. 782,747. PATENTED FEB. 14, 1905.
A. GOLDSTAUB.
INHALING DEVICE.
APPLICATION FILED DEC. 3, 1903.
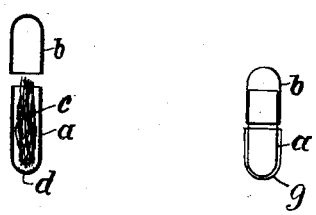
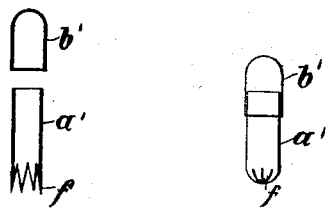

No. 782,747.

Patented February 14, 1905.

UNITED STATES PATENT OFFICE.

ARTHUR GOLDSTAUB, OF HAMBURG, GERMANY.

INHALING DEVICE.

SPECIFICATION forming part of Letters Patent No. 782,747, dated February 14, 1905.

Application filed December 3, 1903. Serial No. 183,627.

*To all whom it may concern:*

Be it known that I, ARTHUR GOLDSTAUB, a subject of the Emperor of Germany, residing at 32 Grindelallee, Hamburg, Germany, have invented new and useful Improvements in Inhaling Devices, of which the following is a specification.

This invention has for its object to provide a capsule for containing material to be inhaled, the said capsule being provided with a removable cover and being of such form and construction that when the cover is removed it can readily be introduced into the nostril. The base of the capsule may be formed with short tongues or prongs leading into the interior of the capsule, but leaving a round orifice in the base, so that one end of the wadding impregnated with the substance to be inhaled is held securely by the ends or tips of the tongues, while the small orifice referred to permits of a draft of air through the capsule, which is necessary for inhalation to take place. This small opening may be covered by a cap when the device is not required for use.

In the accompanying drawings are shown two forms of carrying out the present invention.

Figure 1 shows one embodiment with the capsule in opened and closed position. Fig. 2 shows a modification of the capsule in opened position in section and in closed position in elevation. In the opened position the capsule is shown at a certain stage in its manufacture, in which the tongues or prongs above referred to project downward from the base, and in the closed position the capsule is shown in its finished state.

As shown in Fig. 1, the capsule comprises, essentially, two substantially cylindrical parts *a* and *b*, preferably composed of gelatin, *b* serving as a cover for the part *a* and the closed ends of each being of approximately hemispherical form.

It is essential to the invention that the diameter of the capsule renders the device suitable for ready insertion into the nostril.

The material to be inhaled is contained in the part *a*, the base of which is provided with a small opening or openings *d*, so that a current of air can be drawn up through the material within the capsule into the nostril when the cover has been removed. A second cap *g* is also provided to cover the openings *d*, so that no volatile products can escape from the capsule and the material to be inhaled lasts longer.

Among the advantages of this invention are to be considered the fact that when the device is not being used there is no escape of the inhalent, and, further, such capsules being so very cheap after they have been once used they can be thrown away, the capsules being of such size that they can be sold in boxes containing, say, five to ten thereof.

In the modification shown in Fig. 2 the base of the part *a'* is shown provided with tongues *f*, which are adapted to grip the wad or other fibrous material which has been impregnated with the inhalent and to be then bent inward so as to close the capsule, while leaving a small orifice to allow a current of air to pass through the part *a'* when the latter is inserted into the nostril. The cover *b'* of the capsule is of the same form as the cap *b* of the preceding modification.

What I claim as my invention, and desire to secure by Letters Patent, is—

1. As an improved article of manufacture a capsule for containing inhalent, comprising two hollow cases of substantially cylindrical form one of said cases having a closed hemispherical end and being adapted to serve as a cover for the other of said cases, said second case being of such dimensions as to be capable of ready insertion into the nostril and said case having an unrestricted air-inlet at its base to permit a draft of air through said case to volatilize the inhalent, and a removable dome-shaped cap serving to close said case when desired, as shown and described.

2. The herein-described capsule for containing material to be inhaled comprising two hollow cases *b'* and *a'* of substantially cylindrical form, the case *b'* having a closed hemispherical end and being adapted to serve as a cover for the case *a'*, said case *a'* having tongues projecting from its outer end and adapted to grip the fiber impregnated with material to be inhaled and to be folded inward so as to leave an orifice for a draft to pass through said case, said case $a'$ being also of such dimensions as to readily enter the nostril.

In testimony whereof I have signed my name to this specification in the presence of two subscribing witnesses.

ARTHUR GOLDSTAUB.

Witnesses:
 GUSTAV WEBER,
 T. CHRIST. HAFERMANN.